Nov. 15, 1927.  W. J. HAMBLEN  1,649,588
LATHE
Filed July 24, 1923
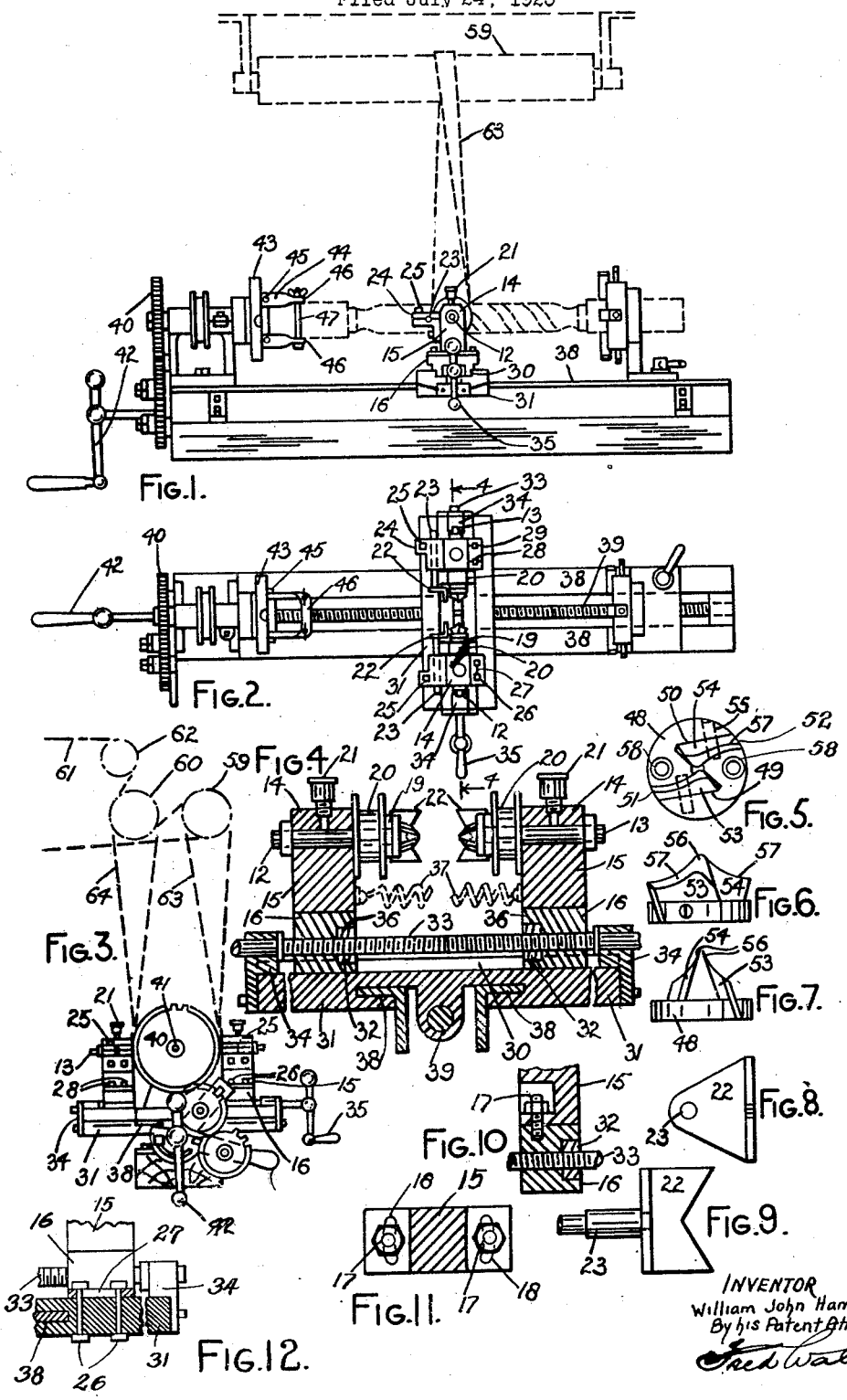
INVENTOR
William John Hamblen.
By his Patent Attorney,
Fred Walsh Patented Nov. 15, 1927.

1,649,588

UNITED STATES PATENT OFFICE.

WILLIAM JOHN HAMBLEN, OF LIDCOMBE, NEAR SYDNEY, NEW SOUTH WALES, AUSTRALIA.

LATHE.

Application filed July 24, 1923, Serial No. 653,584, and in Australia August 12, 1922.

This invention has been specially devised to convert an ordinary lathe into an effective machine for producing spiral rolls on and flutes in, as well as straight reeds on and flutes in, rods and spindles, specially the wooden legs and other parts of furniture such as that known as Jacobean furniture, as well as bannisters and other work. And these improvements, converting an ordinary lathe into such machine or spiral lathe as herein termed, are cheaply and simply constructed and make said spiral lathe capable of turning out straight work with one or more spiral rolls thereon in one operation quickly and cheaply and further similarly turning out work with reeds or flutes.

According to these improvements such a spiral lathe has two tool spindles set transversely to the axis of the lathe and opposite to one another and each axially adjustable on a travelling block which is slidable in transverse slides or guideways provided in or on a lathe saddle slidable on an ordinary lathe bed carrying head and tail stocks. Each travelling block is nutted to a right and left hand leading screw, the leading screws having turn handles. Each spindle has thereon a pulley driven by an endless belt from an overhead long pulley or roller which may be driven from any suitable source of power. Each travelling block has a V-ended rod adjustably fixed thereto adapted to form centering guides for the material and when abutting the material or each other to form a stop or gauge for depth of cut. And each tool spindle on its inner end has a face plate or chuck or other holder for interchangeable revolvable tools or cutters, each of peculiar construction for making respectively spiral rolls, spiral flutes, straight reeds and straight flutes.

In order that this invention may be more readily understood and carried into practical effect it will now be described with reference to the drawings, which are more or less schematic, accompanying and forming part of this complete specification.

Fig. 1 is a side elevation, Fig. 2 a plan and Fig. 3 an end elevation respectively of a lathe constructed according to these improvements and Fig. 4 is a section taken on line 4—4 in Fig. 2, on an enlarged scale. Fig. 5 is a plan and Figs. 6 and 7 are elevations respectively of cutters, Figs. 8 and 9 are details of centering guides, and Figs. 10, 11 and 12 are details of pedestal and travelling block connections, Fig. 10 being a section similar to Fig. 4, but with the upper part of Fig. 10 sectioned in a different plane, and Fig. 11 is a sectional plan of what is shown in Fig. 10, Figs. 10 and 11 showing the pivotal adjustment on the travelling blocks of the pedestals which carry the tool spindles, while Fig. 12 is a partial vertical section similar to Fig. 4, showing means for adjusting the travelling blocks.

The tool spindles 12 and 13 each have bearings 14 in pedestals 15 which are in a partly revolvable manner adjustably affixed to the travelling blocks 16 by set bolts 17 passing through arcuate bolt holes 18 in the pedestals 15 as shown in Figs. 10 and 11, (but other means might be employed for effecting this pivotal adjustment), and each spindle has a face plate 19, pulley 20 and is lubricated from an oil cup 21. Each pedestal has a V-ended cutter guide 22 with a shank 23 by which it is held in a bracket 24, on the pedestal (Fig. 1), by set bolt 25. One travelling block 16 has adjustment longitudinally by means of set bolts 26 passing through elongated holes 27 and the other travelling block has adjustment transversely by means of set bolts 28 passing through elongated holes 29, as shown in the drawings. Each travelling block 16 is on slides 30 on lathe saddle 31 and each has a nut 32 embracing the right and left hand thread respectively of a transverse leading screw 33 which is journaled in bearings 34 in said lathe saddle 31 and has a turn handle 35. In a preferred construction, shown in the drawings, the travelling block nuts 32 are in recesses 36 in each block 16 and a plurality of helical springs 37 are provided to keep the said blocks 16 against the nuts 32 and up to the work.

The saddle 31 is on slides 38 and is nutted to a main leading screw 39 geared as at 40 to the headstock spindle 41 and having a turn handle 42. Fast to the headstock spindle 41 is a face plate 43 and a centre (not shown). The face plate 43 has two pairs of arms 44 pivoted thereto by pivot pins 45 and each pair of arms support a bridge or holding bar 46 through which pass two clamping bolts 47.

A revolvable tool for cutting a right hand spiral roll comprises a disc or circular body 48 having two part-chord slots 49 and 50 parallel to one another starting at diametrically opposite peripheral points 51 and 52 and reaching slightly beyond the centre of the body 48 and at equal radial distances therefrom and inclined angularly to the face of the body. Set in these slots and inclined towards one another are cutter blades 53 and 54 which are interchangeably affixed in the slots 49 and 50 of the body 48 by set screws 55 and so converge towards the axial line of the body and towards each others cutting edge. Each blade 53 and 54 is somewhat pointed at its inner edge 56 towards which edge the sharpening chamfer inclines and each tapering point covers that of the other blade and very slightly overlaps the body centre and from these points 56 the further cutting edge 57 of each blade is shaped alike and complementary to the contour of the desired spiral roll and these blades are adapted to cut when revolved dextrorsally. The revolvable tool for cutting a left hand spiral roll has the part-chord slots in its base oppositely set to those before described while the blades are oppositely chamfered and contoured and are adapted to cut when revolved sinistrorsally. Obviously the shape or contours of the cutting edges of the tools may be varied and may be anything desired, depending upon the work to be done, such contour, of course, being always complementary to the contour to be produced on the work. For example, for cutting spiral flutes, having more or less concave contours, the complementary revolvable tools are similar to those before described but with more or less convex contours from the overlapping central points instead of concave ones. Likewise for cutting straight reeds or straight flutes the revolvable tools are made similarly to those before described but with cutting edges from the overlapping central points contoured complementary to the face of the desired reed or flute.

The selected tools in pairs are held on the tool spindles face plates 19 by set screws 58 passing through each body 48 and the said face plates 19 act as abutments for the cutters 53 and 54. Two rollers 59 and 60 are positioned over the lathe slides 38, are driven in opposite directions by a belt 61 from a power shaft or prime motor passing over a jockey pulley 62 and each roller has an endless belt 63 and 64 travelling around it and one of the spindle pulleys 20.

In operation to turn a spiral roll on a blank or length of wood roughly turned down to the outside size required, said blank is centered and gripped between the holding bars 46 by the clamping bolts 47 or if desired an ordinary chuck may be used and it is held in the tail stock as ordinarily. One pedestal 15 is set slightly ahead of the other (to provide for the pitch of the threadlike spiral roll) the cutters revolved at a fairly high speed and the travelling blocks 16 are closed inwardly by the right and left hand leading screw 33 until the V-ended guides 22 abut the work or each other thus limiting the depth of the cut and at the same time centering the blank and keeping it steady. The gears between the leading screw 39 and the headstock spindle 41 having been set in required ratio the leading screw handle 42 is revolved to feed the saddle 31 along the lathe slides 38 and at the same time the blank revolving at the required speed a finely finished two start right hand spiral roll is produced by the described one operation. That is to say, two independent spiral cuts are made at the same time, one by each of the two diametrically opposite cutters, each cutter operating on an independent line of cut, thereby to produce between them two complete spiral rolls at a single operation, one side of each roll being formed by one of the revolving tools or cutters while the other sides of each roll are formed at the same time by the other revolving cutting tool.

Where a left hand spiral roll is desired the left hand cutters are employed and rotated in the reverse direction. The lathe spindle is also reversely revolved and the gearing between the leading screw and the headstock set to allow the saddle carrying the cutters to travel towards the headstock as ordinarily.

For cutting straight reedings and flutings, the headstock spindle is not revolved and is locked at any desired point while its gearing connection to the leading screw is unmeshed. The revolving cutters on the tool spindles are fed into the stationary work and travelled along the lathe bed and when one channel is cut the headstock spindle is turned to present a new surface to the cutters and again locked at the required angle, the revolved work being turned sufficiently so that the cutters will clear the edge of the last made channel. For cutting flutings the blank is turned to provide for the required flat between the edges of the channels. Any suitable means may be provided to lock the freed head stock spindle, and thus the work, against angular displacement from any desired angular position at which it may be set, and such means, for example, may be a suitable brake (not shown and not claimed). If desired, as a matter of convenience in angularly adjusting or resetting the work as above described, a suitable angle index (not shown and not claimed) may be provided for the head stock spindle.

For cutting spiral rolls or other work on a tapered blank the latter is held between the stocks as ordinarily and the guides 22 set to allow the required depth of cut. The pedestals 15 of the tool spindles are then set to the angle of the taper by part rotation and the cutters are then fed into the work and the travelling blocks 16 freed from the nuts 32 which are screwed to the centre of the leading screw 33 so that the cutters are then controlled by the springs 37 which keep the said cutters up to the work but allow them to retire as the guides 22 follow the line of the taper.

What I claim as my invention and desire to secure by Letters Patent is:—

1. In a lathe, the combination with a main leading screw and a travelling saddle thereon to be fed thereby, of a right and left hand leading screw transverse to the main leading screw and journaled in bearings on the saddle, two travelling blocks to be fed by the right and left hand threads respectively of the transverse leading screw, two opposed revolving tool spindles carried by the respective blocks with their axes transverse to the main leading screw and in a plane parallel thereto and also parallel to the transverse leading screw, and an adjustable centering and cut-depth gauging guide carried by each of said blocks.

2. In a lathe, the combination of, a main leading screw, a travelling saddle to be fed by said screw, a right and left hand leading screw transverse to the main leading screw and journaled in bearings on the saddle, two travelling blocks slidably guided on the saddle for movement transverse to the main leading screw, two opposed rotatable tool spindles carried by the respective blocks with their axes transverse to the main leading screw and in a plane parallel thereto and also parallel to the transverse leading screw, two nuts on the right and left hand threads respectively of the transverse leading screw at the inner sides of said blocks to form abutments for the latter, and spring means urging said blocks towards each other and against said nuts for thereby holding the tools on the tool spindles up to the work.

3. In a lathe, the combination of, a main leading screw, a travelling saddle to be fed by said screw, two travelling blocks slidably guided on the saddle for movement transverse to the main leading screw, two opposed rotatable tool spindles carried by the respective blocks with their axes transverse to the main leading screw and in a plane parallel thereto and also parallel to a transverse leading screw, a right and left hand leading screw transverse to the main leading screw and journaled in bearings on the saddle, two nuts on the right and left hand threads respectively of the transverse leading screw at the inner side of said blocks and forming abutments therefor, an adjustable gauging device carried by each of said blocks to engage the work in advance of the tool, and spring means urging the travelling blocks towards each other.

In testimony whereof I have signed my name to this specification.

WILLIAM JOHN HAMBLEN.